(12) United States Patent
Cho et al.

(10) Patent No.: US 11,715,602 B2
(45) Date of Patent: Aug. 1, 2023

(54) MULTILAYER ELECTRONIC COMPONENT

(71) Applicant: SAMSUNG ELECTRO-MECHANICS CO., LTD., Suwon-si (KR)

(72) Inventors: Min Jung Cho, Suwon-si (KR); Byung Kun Kim, Suwon-si (KR); Su Ji Kang, Suwon-si (KR); Yu Hong Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 42 days.

(21) Appl. No.: 16/902,762

(22) Filed: Jun. 16, 2020

(65) Prior Publication Data
US 2021/0035741 A1 Feb. 4, 2021

(30) Foreign Application Priority Data

Aug. 2, 2019 (KR) .................. 10-2019-0094258
Oct. 16, 2019 (KR) .................. 10-2019-0128544

(51) Int. Cl.
*H01G 4/30* (2006.01)
*H01G 4/012* (2006.01)
(Continued)

(52) U.S. Cl.
CPC ............ *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ........ H01G 4/30; H01G 4/012; H01G 4/1227; H01G 4/2325; H01G 4/008; H01G 4/0085; H01G 4/12; H01G 4/224; H01G 4/228; H01G 4/232; H01G 4/248; H01G 2/065; H01G 4/1218
See application file for complete search history.

(56) References Cited

U.S. PATENT DOCUMENTS

| 5,036,424 A | 7/1991 | Yokotani et al. |
| 7,042,707 B2 | 5/2006 | Umeda et al. |

(Continued)

FOREIGN PATENT DOCUMENTS

| CN | 1571855 A | 1/2005 |
| CN | 1610026 A | 4/2005 |

(Continued)

OTHER PUBLICATIONS

J-O Hong et al., "Development History and Trend of High-Capacitance Multi-layer Ceramic Capacitor in Korea," Journal of the Korean Ceramic Society, 2009, vol. 46, No. 2, pp. 161-169.
(Continued)

*Primary Examiner* — Michael P McFadden
(74) *Attorney, Agent, or Firm* — Morgan, Lewis & Bockius LLP

(57) ABSTRACT

A multilayer electronic component includes a body including a dielectric layer and an internal electrode alternately stacked therein in a stacking direction; and an external electrode disposed on the body and connected to the internal electrode. The internal electrode includes 94.0 to 99.6 wt % of Ni and 0.4 to 6.0 wt % of Cu.

23 Claims, 5 Drawing Sheets

(51) Int. Cl.
*H01G 2/06* (2006.01)
*H01G 4/12* (2006.01)
*H01G 4/008* (2006.01)

(56) References Cited

U.S. PATENT DOCUMENTS

| | | |
|---|---|---|
| 7,277,268 B2 | 10/2007 | Celik et al. |
| 8,102,639 B2 | 1/2012 | Kasuya et al. |
| 9,087,639 B2 | 7/2015 | Kim et al. |
| 2002/0011131 A1 | 1/2002 | Hosokura et al. |
| 2004/0256603 A1* | 12/2004 | Celik .................... C22C 1/0425 252/500 |
| 2005/0088803 A1* | 4/2005 | Umeda ............... C04B 35/6303 361/321.2 |
| 2009/0067117 A1* | 3/2009 | Kasuya .................... H01G 4/30 156/89.18 |
| 2013/0134836 A1 | 5/2013 | Hwang et al. |
| 2013/0141835 A1* | 6/2013 | Hwang ................... H01G 4/30 29/829 |
| 2013/0286539 A1* | 10/2013 | Kim ..................... H01G 13/006 264/615 |
| 2014/0139308 A1 | 5/2014 | Son et al. |
| 2015/0014035 A1 | 1/2015 | Park et al. |
| 2015/0380159 A1* | 12/2015 | Lee ........................ H01G 4/012 156/89.12 |
| 2016/0358712 A1 | 12/2016 | Doi et al. |
| 2017/0076865 A1 | 3/2017 | Tanaka et al. |
| 2019/0051459 A1 | 2/2019 | Mizuno |
| 2019/0074138 A1 | 3/2019 | Song et al. |
| 2019/0096584 A1 | 3/2019 | Hong et al. |
| 2019/0267189 A1* | 8/2019 | Makino ................ H01G 4/1227 |

FOREIGN PATENT DOCUMENTS

| | | | |
|---|---|---|---|
| CN | 101354962 A | 1/2009 | |
| CN | 102105954 A | 6/2011 | |
| CN | 103137327 A | 6/2013 | |
| CN | 103377824 A | 10/2013 | |
| CN | 103839668 A | 6/2014 | |
| CN | 104282432 A | 1/2015 | |
| CN | 105206422 A | 12/2015 | |
| CN | 106206008 A | 12/2016 | |
| CN | 106887330 A | 6/2017 | |
| CN | 107039178 A | 8/2017 | |
| CN | 109390150 A | 2/2019 | |
| JP | 2005044819 A | * 2/2005 | ............. B32B 18/00 |
| KR | 10-2013-0027781 A | 3/2013 | |
| KR | 10-1532116 B1 | 6/2015 | |
| KR | 10-2016-0143516 A | 12/2016 | |

OTHER PUBLICATIONS

Chinese Office Action dated Jul. 26, 2022, issued in corresponding Chinese Patent Application No. 202010717584.X (with English translation).

* cited by examiner

I - I'

II - II'

MULTILAYER ELECTRONIC COMPONENT

CROSS-REFERENCE TO RELATED APPLICATION(S)

The present application claims the benefit of priority to Korean Patent Application No. 10-2019-0094258 filed on Aug. 2, 2019 and Korean Patent Application No. 10-2019-0128544 filed on Oct. 16, 2019 in the Korean Intellectual Property Office, the disclosures of which are incorporated herein by reference in their entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of a variety of electronic products including imaging devices, such as a liquid crystal display (LCD), a plasma display panel (PDP), and the like, computers, smartphones, mobile phones, and the like, and may be configured to charge electricity in or discharge electricity from the devices.

A multilayer ceramic capacitor may be used as a component of various electronic devices as a multilayer ceramic capacitor is relatively small in size, may secure high capacity and may be easily mounted. As electronic devices such as computers, mobile devices, and the like, have been designed to have reduced sizes and to operate at high power, there has been increased demand for miniaturization and high capacity of multilayer ceramic capacitors.

To reduce a size of a multilayer electronic component and to implement high capacitance, a technique of reducing a thickness of each of an internal electrode and a dielectric layer may be required.

When an Ni electrode is used as an internal electrode of the multilayer electronic component, as the number of layers increases in accordance with high capacitance, a volume of the Ni electrode occupied in an MLCC chip may significantly increase. To layer a larger number of dielectric layers within a limited thickness, a thickness of the Ni electrode needs to be decreased. However, the more the thickness of the Ni electrode decreases, the more the connectivity between Ni particles may be deteriorated, such that an effective electrode area may decrease. Thus, there have been continuous attempts to reduce a thickness of an Ni electrode without the above-described issue.

SUMMARY

An aspect of the present disclosure is to improve electrode connectivity of an internal electrode.

Another aspect of the present disclosure is to improve strength of an internal electrode.

Another aspect of the present disclosure is to improve smoothness of an internal electrode.

Another aspect of the present disclosure is to improve oxidation resistance of an internal electrode.

Another aspect of the present disclosure is to provide a multilayer electronic component having improved reliability, a reduced size, and high capacitance.

According to an aspect of the present disclosure, a multilayer electronic component includes a body including a dielectric layer and an internal electrode alternately staked therein in a stacking direction; and an external electrode disposed on the body and connected the internal electrode The internal electrode includes 94.0 to 99.6 wt % of Ni and 0.4 to 6.0 wt % of Cu.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
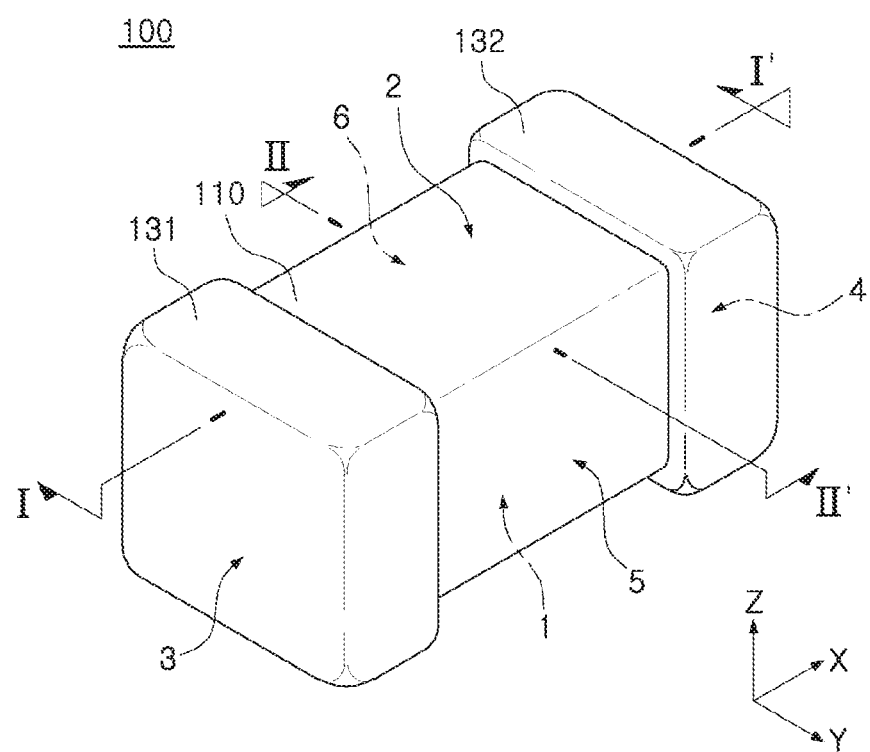
FIG. 1 is a perspective diagram illustrating a multilayer electronic component according to an exemplary embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

In the drawings, certain elements may be omitted to allow the present disclosure to be clearly described, and to clearly express a plurality of layers and areas, thicknesses may be magnified. The same elements having the same function within the scope of the same concept will be described using the same reference numerals. Further, throughout the specification, it will be understood that when a portion "includes" an element, it can further include another element, not excluding another element, unless otherwise indicated.

In the drawing, an X direction is a second direction, an L direction, or a length direction, a Y direction is a third direction, a W direction, or a width direction, and a Z direction is a first direction, a layering direction, a T direction, or a thickness direction.

Multilayer Electronic Component

FIG. 1 is a perspective diagram illustrating a multilayer electronic component according to an exemplary embodiment.

Figure 2:
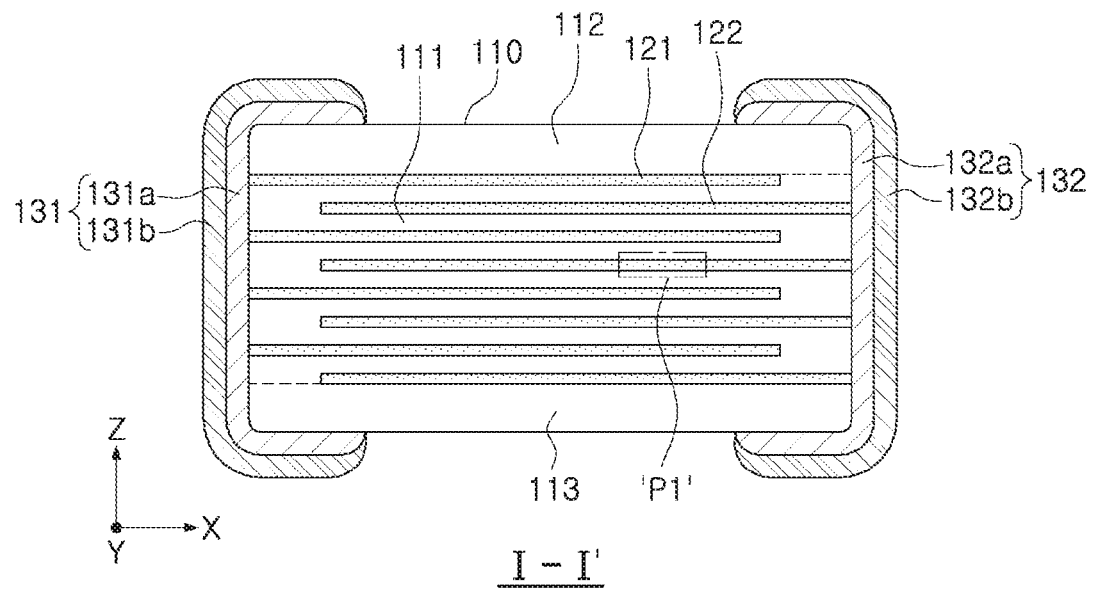
FIG. 2 is a cross-sectional diagram taken along line I-I' in FIG. 1.

FIG. 2 is a cross-sectional diagram taken along line I-I' in FIG. 1.

Figure 3:
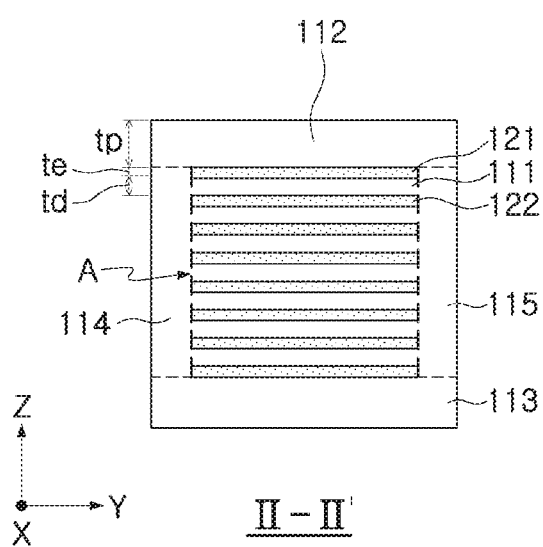
FIG. 3 is a cross-sectional diagram taken along line II-II' in FIG. 1.

FIG. 3 is a cross-sectional diagram taken along line II-II' in FIG. 1.

Figure 4:
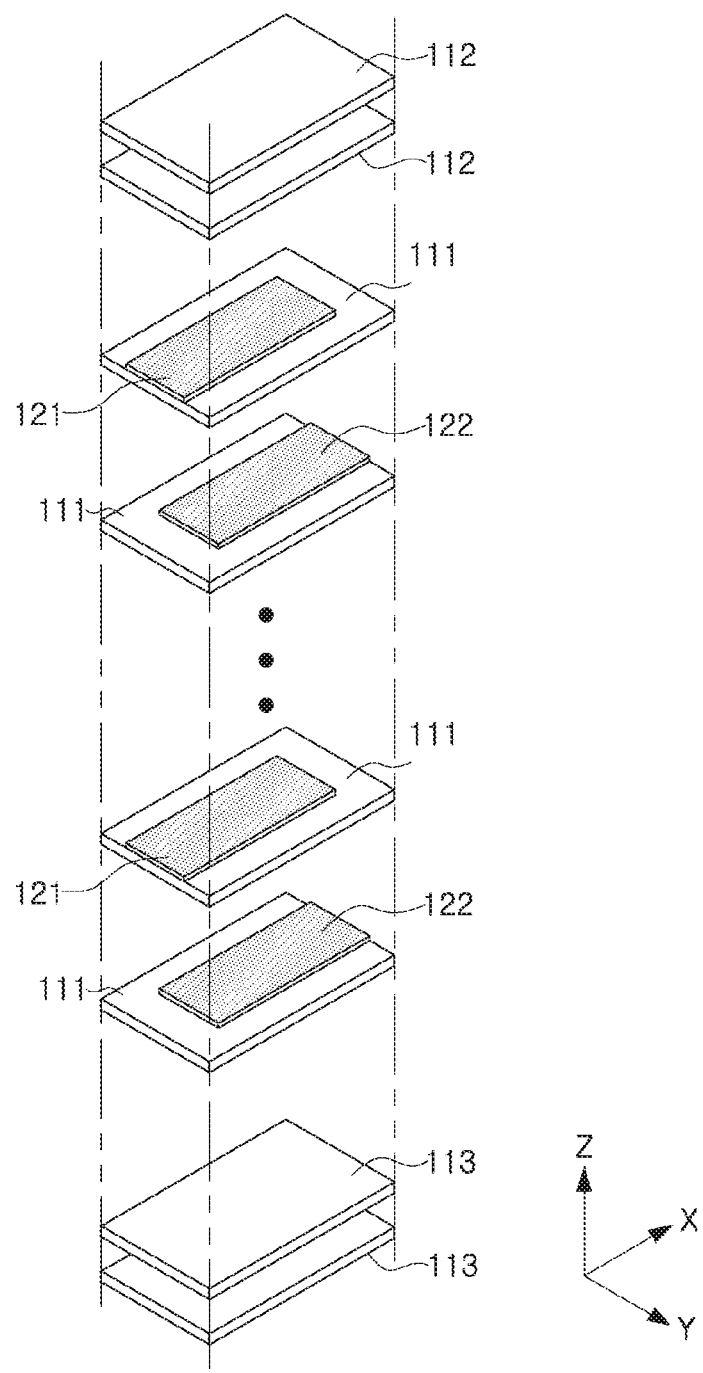
FIG. 4 is an exploded perspective diagram illustrating a body in which a dielectric layer and an internal electrode are stacked according to an exemplary embodiment of the present disclosure.

FIG. 4 is an exploded perspective diagram illustrating a body in which a dielectric layer and an internal electrode are stacked according to an exemplary embodiment.

In the description below, a multilayer electronic component will be described in accordance with the exemplary embodiment.

A multilayer electronic component 100 may include a body 110 including a dielectric layer 111 and internal electrodes 121 and 122 alternately disposed with the dielectric layer 111 interposed therebetween; and external electrodes 131 and 132 disposed on the body 110 and connected to the internal electrodes 121 and 122. The internal electrodes 121 and 122 may include 94.0 to 99.6 wt % of Ni and 0.4 to 6.0 wt % of Cu.

In the body 110, the dielectric layer 111 and the internal electrodes 121 and 122 may be alternately stacked in a stacking direction.

The body 110 may not be limited to any particular shape. As illustrated, the body 110 may have a hexahedral shape or a shape similar to a hexahedron. Due to contraction of a ceramic powder included in the body 110 during a sintering process, the body 110 may not have an exactly hexahedral shape with straight lines, but may have a substantially hexahedral shape.

The body 110 may have first and second surfaces 1 and 2 opposing each other in a thickness direction (Z direction), third and fourth surfaces 3 and 4 connected to the first and second surfaces 1 and 2 and opposing each other in a width direction (Y direction), and fifth and sixth surfaces 5 and 6 connected to the first and second surfaces 1 and 2 and the third and fourth surfaces 3 and 4 and opposing each other in a length direction (X direction). The thickness direction may be the stacking direction in which the dielectric layer 111 and the internal electrodes 121 and 122 may be alternately stacked.

The plurality of the dielectric layers 111 forming the body 110 may be in a sintered state, and may be integrated such that boundaries between adjacent dielectric layers 111 may be difficult to identify without using a scanning electron microscope (SEM).

According to the exemplary embodiment, a material of the dielectric layer 111 may not be limited to any particular material as long as sufficient capacitance is able to be obtained therewith. For example, as the material, a barium titanate material, a Perovskite material compound with lead (Pb), a strontium titanate material, or the like, may be used. The barium titanate material may include a BaTiO3-based ceramic powder, and an example of the ceramic powder may include BaTiO3, (Ba1-xCax)TiO3, Ba(Ti1-yCay)O3, (Ba1-xCax)(Ti1-yZry)O3, Ba(Ti1-yZry)O3, or the like, in which calcium (Ca), zirconium (Zr), and the like, are partially solid-solute in BaTiO3, or the like.

As the material of the dielectric layer 111, various ceramic additives, organic solvents, plasticizers, coupling agents, dispersing agents, and the like, may be added in addition to power such as barium titanate (BaTiO3) powder, or the like, depending on an intended purpose.

A thickness td of the dielectric layer 111 may not be limited to any particular size.

When a thickness of the dielectric layer is less than 0.6 μm, particularly when a thickness of the dielectric layer is less than 0.41 μm, moisture resistance may degrade.

According to the exemplary embodiment, even when a thickness of each of the dielectric layer and the internal electrode is significantly reduced, discontinuation and agglomeration of an electrode may be effectively prevented such that moisture resistance may improve. Accordingly, even when a thickness of the dielectric layer is less than 0.41 μm, sufficient moisture resistance may be secured.

When a thickness of the dielectric layer 111 is 0.41 μm or less, an effect of improvement in moisture resistance may significantly increase.

The thickness td of the dielectric layer 111 may refer to an average thickness of the dielectric layer 111 disposed between the first and second internal electrodes 121 and 122.

An average thickness of the dielectric layer 111 may be measured by scanning an image of a cross-sectional surface taken in a length and thickness direction (L-T) of the body 110 using a scanning electron microscope (SEM).

For example, in a random dielectric layer extracted from an image obtained by scanning a cross-sectional surface taken in a length and thickness direction (L-T) of a central portion of the body 110 taken in a width direction, an average value of thicknesses of 30 points with an equal gap may be measured in a length direction.

A thickness measured from the 30 points with an equal gap may be measured by a capacitance forming portion A referring to a region in which the first and second internal electrodes 121 and 122 overlap each other.

The body 110 may include a capacitance forming portion disposed in the body 110 and forming capacitance including the first internal electrode 121 and the second internal electrode 122 disposed to oppose each other with the dielectric layer 111 interposed therebetween, and cover portions 112 and 113 disposed on and below the capacitance forming portion A.

The capacitance forming portion may contribute to forming capacitance of the capacitor, and may be formed by alternatively disposing a plurality of the first and second internal electrodes 121 and 122 with the dielectric layer 111 interposed therebetween.

The upper cover portion 112 and the lower cover portion 113 may be formed by disposing a single dielectric layer or layering two or more dielectric layers on upper and lower surfaces of the capacitance forming portion A, respectively, and may prevent damage to an internal electrode caused by physical or chemical stress.

The upper cover portion 112 and the lower cover portion 113 may not include an internal electrode, and may include a material the same as a material of the dielectric layer 111.

In other words, the upper cover portion 112 and the lower cover portion 113 may include a ceramic material. For example, the upper cover portion 112 and the lower cover portion 113 may include a BaTiO3-based ceramic material.

A thickness of each of the cover portions 112 and 113 may not be limited to any particular size. To reduce a size of the multilayer electronic component and to implement capacitance, a thickness of each of the cover portions 112 and 113 may be 20 μm or less.

Also, margin potions 114 and 115 may be disposed on a side surface of the capacitance forming portion A.

The margin potions 114 and 115 may include a margin portion 114 disposed on the sixth surface 6 of the body 110 and a margin portion 115 disposed on the fifth surface 5. The margin potions 114 and 115 may be disposed on both side surfaces of the body 110 in a width direction.

The margin potions 114 and 115 may refer to a region between both ends of the first and second internal electrodes 121 and 122 and a boundary surface of the body 110 on a cross-sectional surface of the body 110 taken in a width-thickness (W-T) direction as illustrated in FIG. 3.

The margin potions 114 and 115 may prevent damages to the internal electrodes caused by physical or chemical stress.

The margin potions 114 and 115 may be formed by forming the internal electrodes by applying a conductive paste to a region of a ceramic green sheet other than a region in which the margin portions are formed.

Also, to prevent a step portion formed by the internal electrodes 121 and 122, a cutting process may be performed to expose the internal electrodes to the fifth and sixth surfaces 5 and 6 of the body after layering the internal electrodes, and a single dielectric layer or two or more dielectric layers may be stacked on both side surfaces of the capacitance forming portion A, thereby forming the margin potions 114 and 115.

The internal electrodes 121 and 122 may be alternately stacked with the dielectric layer 111.

The internal electrodes 121 and 122 may include the first and second internal electrodes 121 and 122. The first and second internal electrodes 121 and 122 may be alternately stacked and opposing each other with the dielectric layer 111 interposed therebetween, and may be exposed to the third and fourth surfaces 3 and 4 of the body 110, respectively.

Referring to FIG. 2, the first internal electrode 121 may be spaced apart from the fourth surface 4, and may be exposed to the third surface 3. The second internal electrode 122 may be spaced apart from the third surface 3, and may be exposed through the fourth surface 4.

The first and second internal electrodes 121 and 122 may be electrically isolated from each other by the dielectric layer 111 disposed therebetween.

Referring to FIG. 4, the body 110 may be formed by alternately layering a ceramic green sheet on which the first internal electrode 121 is printed and a ceramic green sheet on which the second internal electrode 122 is printed and performing a sintering process.

The internal electrodes 121 and 122 may include 94.0 to 99.6 wt % of Ni and 0.4 to 6.0 wt % of Cu. Accordingly, connectivity between Ni particles of the internal electrodes may improve, strength of the internal electrodes may improve, and high temperature load reliability, moisture reliability, and the like, of the multilayer electronic component may improve.

Cu may have an oxidation degree lower than that of Ni. When a certain content of Cu is added in accordance with the exemplary embodiment, oxidation resistance of the internal electrodes may improve, and also oxidation may be reduced in a manufacturing process such that connectivity between Ni particles may improve, and moisture resistance may improve.

Particularly, when 0.4 wt % or higher of Cu is included, a contraction rate in the thickness direction (Z direction) may rapidly improve, and accordingly, connectivity between Ni particles may improve, capacitor capacitance may improve, and load reliability and moisture reliability may improve. An electrode thickness deviation and electrode connectivity may also improve.

When a content of Cu exceeds 6.0 wt %, T-reduction caused by addition of Cu, the improvement of MTTF and moisture reliability, and the like, may be insufficient.

According to an exemplary embodiment, internal electrode connectivity of the internal electrodes 121 and 122 may be 90% or higher.

The internal electrode connectivity may be defined as a ratio of a length of a portion in which the internal electrode is actually formed to an overall length of the internal electrode.

Figure 5:
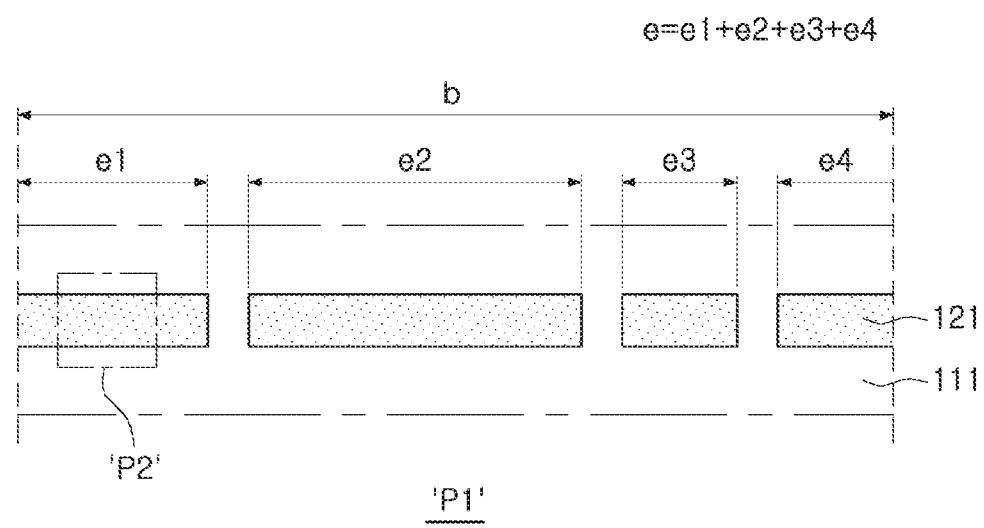
FIG. 5 is a diagram illustrating region P1 illustrated in FIG. 2.

For example, when an overall electrode length measured at one point of the first internal electrode 121 is defined as b, and lengths of the portions in which the electrodes are actually formed are defined as e1, e2, e3, and e4, respectively, the internal electrode connectivity may be represented by e/b, a value obtained by dividing the sum (e=e1+e2+e3+e4) of the lengths of the portions in which the electrodes are actually formed by the overall electrode length b, as illustrated in FIG. 5.

When the internal electrode connectivity is lower than 90%, it may be difficult to secure sufficient capacitance.

In the internal electrode in which a certain content of Cu is added to Ni in the exemplary embodiment, a ratio of reduction of the body in a thickness direction (T reduction) may improve such that 90% or higher of the internal electrode connectivity may be secured.

It may not be necessary to limit an upper limit of the internal electrode connectivity to any particular example, but in consideration of a manufacturing process, and the like, the upper limit may be 97%.

An electrode thickness deviation of the internal electrodes 121 and 122 may be 15% or lower.

In the internal electrode in which a certain content of Cu is added to Ni in the exemplary embodiment, a ratio of reduction of the body in the thickness direction (T reduction) may improve such that agglomeration of an electrode may be prevented. Also, the electrode thickness deviation may be secured at 15% or lower such that smoothness of each internal electrode may be improved.

Cu included in the internal electrode may be uniformly distributed in the internal electrode.

As Cu included in the internal electrode is uniformly distributed in the internal electrode, oxidation resistance of the internal electrode may increase, and a reduction rate in the thickness direction (Z direction) may uniformly improve such that the electrode thickness deviation may be decreased.

When Cu included in the internal electrode is not uniformly distributed, oxidation resistance may not improve in one portion of the internal electrode such that the improvement of connectivity between Ni particles may be insufficient, and the electrode thickness deviation may increase.

Also, when Cu is not uniformly distributed in the internal electrode, an oxide film between electrode-dielectric interfacial surfaces may not be uniformly removed. As Cu having excellent oxidation resistance is uniformly distributed in the internal electrode, an oxide film between electrode-dielectric interfacial surfaces may be uniformly removed.

A method of uniformly distributing Cu may not be limited to any particular method, and Cu may be uniformly distributed in the internal electrode in consideration of a particle size of a conductive powder particle and by controlling sintering conditions and use of Ni—Cu alloy powder, and the like.

Figure 6:
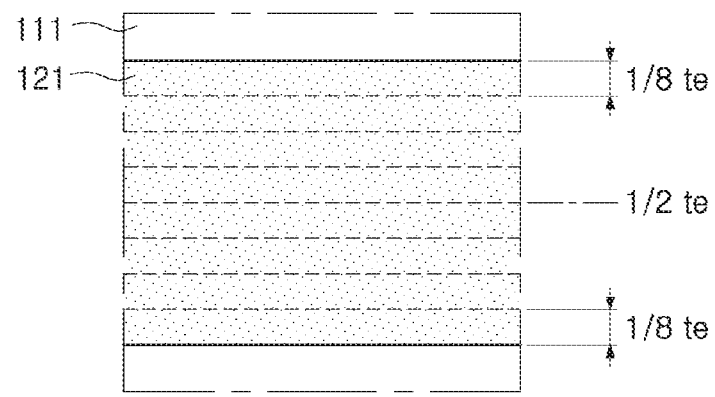
FIG. 6 is a diagram illustrating region P2 illustrated in FIG. 5.

With respect to the configuration in which Cu included in the internal electrode is uniformly distributed in the internal electrode, referring to FIG. 6, in the internal electrode 121, a deviation between a content of Cu at a ½ point of the internal electrode in the layering direction and a content of Cu at a ⅛ point of the internal electrode in the layer direction may be 0.1 wt % or lower.

In the exemplary embodiment, Ni and Cu included in the internal electrodes 121 and 122 may be included in a form of an Ni—Cu alloy.

Ni and Cu included in the internal electrodes 121 and 122 may be configured to be included in an alloy form by controlling sintering conditions, use of Ni—Cu alloy powder, and the like.

As Ni and Cu are included in a form of an Ni—Cu alloy, an effect of addition of Cu may improve, and Cu included in the internal electrode may be uniformly distributed in the internal electrode.

The internal electrodes 121 and 122 may be formed of an Ni—Cu alloy.

Discontinuation of an internal electrode may occur due to a difference in temperature of contraction initiation of the dielectric layer and the internal electrode. To prevent the discontinuation of the internal electrode by delaying the contraction of the internal electrode, a ceramic additive (hereinafter, referred to as a ceramic common material) for delaying contraction of the internal electrode may be added to a paste used for an internal electrode. For example, a certain content of BaTiO3 may be added to the paste used for an internal electrode.

When a ceramic common material is added to the paste used for an internal electrode, however, connectivity of the internal electrode may improve, but the ceramic common material may be trapped in the internal electrode even after a sintering process such that an Ni-filling rate may degrade.

In the exemplary embodiment, by controlling a content of Cu added to the paste used for an internal electrode, the Ni-filling rate may improve such that electrode connectivity may be secured without adding a ceramic common material to the paste used for an internal electrode.

Thus, in the exemplary embodiment, the internal electrodes 121 and 122 may be formed using the paste used for an internal electrode which does not include a ceramic common material, and accordingly, the internal electrodes 121 and 122 may not include the ceramic common material.

As the ceramic common material is not included in the paste used for an internal electrode, and other elements such as a binder, an organic solvent, and the like, included in the paste used for an internal electrode may be combusted and disappear during a binder burn-out process, a sintering process, and other processes, the internal electrodes 121 and 122 may be formed of an Ni—Cu alloy.

A thickness to of each of the internal electrodes 121 and 122 may not be limited to any particular size.

When a thickness of each of the internal electrodes 121 and 122 is less than 0.6 µm, particularly when a thickness of each of the internal electrodes 121 and 122 is 0.41 µm or less, moisture reliability may degrade.

As described above, in the exemplary embodiment, even when a thickness of each of the dielectric layer and the internal electrodes is extremely thin, an increase of discontinuation and agglomeration of an electrode may be effectively prevented such that moisture resistance may improve. Thus, even when a thickness of each of the internal electrodes 121 and 122 is 0.41 µm or lower, sufficient moisture reliability may be secured.

Thus, when a thickness of each of the internal electrodes 121 and 122 is 0.41 µm or less, moisture resistance may improve such that the capacitor component may have a reduced size and high capacitance.

The thickness to of each of the internal electrodes 121 and 122 may refer to an average thickness of the internal electrodes 121 and 122.

The average thickness of the internal electrodes 121 and 122 may be measured by scanning an image of a cross-sectional surface in a length and thickness direction (L-T) of the body 110 using a scanning electron microscope (SEM).

For example, in random first and second internal electrodes 121 and 122 extracted from an image obtained by scanning a cross-sectional surface taken in a length and thickness direction (L-T) of a central portion of the body 110 taken in a width direction, an average value of thicknesses of 30 points with an equal gap may be measured in a length direction.

The external electrodes 131 and 132 may be disposed in the body 110 and may be connected to the internal electrodes 121 and 122.

As illustrated in FIG. 2, the external electrodes 131 and 132 may include the first and second external electrodes 131 and 132 disposed on the third surface and the fourth surface 3 and 4 of the body 110 and connected to the first and second internal electrodes 121 and 122, respectively.

In the exemplary embodiment, the example in which the multilayer electronic component 100 has two external electrodes 131 and 132, but an exemplary embodiment thereof is not limited thereto. The number of the external electrodes 131 and 132 and a shape of each of the external electrodes 131 and 132 may be varied in accordance with the form of the internal electrodes 121 and 122 or for other purposes.

As the material of the external electrodes 131 and 132, a material having electrical conductivity, such as a metal, may be used, and the material may be determined in consideration of electrical properties, structural stability, and the like. Further, the external electrodes 131 and 132 may have a multilayer structure.

For example, the external electrodes 131 and 132 may include the electrode layers 131a and 132a disposed on the body 110 and plating layers 131b and 132b disposed on the electrode layers 131a and 132a.

As an example of the electrode layers 131a and 132a, the electrode layers 131a and 132a may be configured as sintered electrodes including a conductive metal and glass, or may be configured as resin-based electrodes including a conductive metal and a resin.

The electrode layers 131a and 132a may be formed by forming a sintered electrode and a resin-based electrode in order on the body. The electrode layers 131a and 132a may be formed by a method of transferring a sheet including a conductive metal on the body, or by a method of transferring a sheet including a conductive metal on a sintered electrode.

As the conductive metal included in the electrode layers 131a and 132a, a material having excellent electrical conductivity may be used, and the conductive metal is not limited to any particular material. For example, the conductive metal may be one of nickel (Ni), cupper (Cu), and an alloy thereof.

The electrode layers 131a and 132a may improve mounting properties. A type of the electrode layers 131a and 132a may not be limited to any particular example. The electrode layers 131a and 132a may be configured as plating layers including one or more of Ni, Sn, Pd, or alloys thereof, and may include a plurality of layers.

As an example of the plating layers 131b and 132b, the plating layers 131b and 132b may be configured as Ni-plated layers or Sn-plated layers. The plating layers 131b and 132b may be formed by forming an Ni-plated layer and an Sn-plated layer in order on the electrode layers 131a and 132a, or by forming an Sn-plated layer, an Ni-plated layer, and an Sn-plated layer in order on the electrode layers 131a and 132a. Also, the plating layers 131b and 132b may include a plurality of Ni-plated layers and/or a plurality of Sn-plated layers.

A size of the multilayer electronic component 100 may not be limited to any particular size.

To reduce a size of the multilayer electronic component 100 and to implement high capacitance, the number of layers may need to be increased by decreasing a thickness of each of the dielectric layer and the internal electrodes. Accordingly, the multilayer electronic component 100 having a size of 0402 (length×width, 0.4 mm×0.2 mm) or less may have improved reliability and insulation resistance.

Accordingly, when a distance between the third surface 3 and the fourth surface 4 of the body 110 is defined as L, and a distance between the fifth surface 5 and the sixth surface 6 of the body 110 is defined as W, L may be 0.4 mm or less, and W may be 0.2 mm or less. Thus, the multilayer electronic component 100 may be configured to have a size of 0402 (length×width, 0.4 mm×0.2 mm) or less.

In the description below, a method of manufacturing the multilayer electronic component 100 will be described in accordance with an exemplary embodiment.

A plurality of ceramic green sheets may be prepared.

The ceramic green sheets may be used for forming the dielectric layer 111 of the body 110. To manufacture the ceramic green sheets, slurry may be prepared by mixing ceramic powder, polymer, and solvents, and the slurry may be processed to have a sheet shape having a certain thickness, a thickness of 0.41 μm or lower, for example, through a process such as a doctor blade, or the like.

A conductive paste used for an internal electrode may be printed on one surface of each of the ceramic green sheets in a certain thickness, a thickness of 0.41 μm or lower, for example, thereby forming the internal electrodes.

The conductive paste used for an internal electrode may include 94.0 to 99.6 wt % of Ni and 0.4 to 6.0 wt % of Cu. For example, the conductive paste used for an internal electrode may be formed by mixing Ni powder and Cu powder, or the conductive paste used for an internal electrode may include Ni—Cu alloy powder. The conductive paste used for an internal electrode may include Ni—Cu alloy powder and may not include a ceramic common material. As the Ni—Cu alloy powder is used, Cu may be uniformly distributed in the internal electrode, and as a ceramic common material is not included, an Ni-filling rate may improve.

As a method of printing the conductive paste used for an internal electrode, a screen-printing method, a gravure printing method, or the like, may be used.

Referring to FIG. 4, the ceramic green sheet on which the first internal electrode 121 is printed and the ceramic green sheet on which the second internal electrode 122 is printed may be alternately stacked, and pressure may be applied in a layering direction such that the plurality of stacked ceramic green sheets and the internal electrodes formed on the ceramic green sheets may be pressed, thereby manufacturing a laminate.

At least one or more ceramic green sheets may be stacked on and below the laminate, thereby forming the cover portions 112 and 113.

The cover portions 112 and 113 may be configured to have a composition the same as a composition of the dielectric layer 111 disposed in the laminate, and as the cover portions 112 and 113 do not include the internal electrodes, the cover portions 112 and 113 may be different from the dielectric layer 111.

The laminate may be cut out at a region corresponding to a single capacitor and may be processed to form a chip, and a sintering process may be performed at a high temperature, thereby manufacturing the body 110.

The external electrodes 131 and 132 may be formed to cover exposed portions of the first and second internal electrodes 121 and 122, exposed to both side surfaces of the body 110, and to be electrically connected to the first and second internal electrodes 121 and 122.

If desired, surfaces of the first and second external electrodes 131 and 132 may be plated with nickel or tin.

EXEMPLARY EMBODIMENTS

Sample chips including internal electrodes formed using a conductive paste used for an internal electrode in which a certain content of Cu was added to Ni were prepared. Table 1 lists changes in capacitance, high temperature load reliability, electrode connectivity, T-contraction, and moisture resistance with reference to test No. 1 to which cu was not added. Test No. 2 was a sample chip including internal electrodes formed using the conductive paste used for an internal electrode, which is formed by adding $BaTiO_3$ powder, a ceramic common material, to Ni powder.

High temperature load reliability was tested by performing a high temperature load test under conditions of 125° C. and 8V on 400 samples of each test No, and an initial defect and a mean time to failure (MTTF) were measured.

As for the initial defect, the number of samples in which insulating resistance was 10KΩ or lower for initially 12 hours was determined as initial defects, the number of initial defects of test No. 1 was determined to be 1.0, and relative values are listed. As for a MTTF, the time for which insulating resistance was 10KΩ or lower was determined as a time to failure, a MTTF of test No. 1 was determined to be 1.0, and relative values were listed.

As for moisture resistance, when a voltage of 8V was applied to 400 samples for each test No. for 12 hours at a temperature of 85° C. and a relative humidity of 85%, samples in which an insulation resistance value decreased to 1/10 or lower as compared to an initial value were determined as defects among the 400 samples, and the number of defects of test No. 1 was determined was to be 1.0 and relative values are listed.

As for electrode connectivity, an image was obtained by scanning a cross-sectional surface taken in a length and thickness direction (an L-T cross-sectional surface) of a central portion of a body taken in a width (W) direction was scanned using a scanning electron microscope (SEM), a length of a portion in which an internal electrode was actually formed based on an overall length was measured with respect to overall internal electrodes, electrode connectivity of each of the internal electrodes was calculated, and an average value of the electrode connectivities are listed.

T-contraction was a ratio of reduction of the internal electrode in a thickness direction (Z direction) of the body. As for T-contraction, a ratio between a thickness of a chip formed by printing a paste used for an internal electrode and performing a layering process and a thickness after completing a sample chip was calculated, and a ratio % of an increase of test No. 1 to a contraction rate is listed.

With regard to electrode thickness deviation, a cross-sectional surface (an L-T cross-sectional surface) taken in length and thickness directions of a central portion of a body disposed in a width direction (W) may be scanned using a scanning electron microscope (SEM), and an electrode thickness deviation may be obtained for each of thirty internal electrodes disposed in the central portion in the thickness direction. Here, an electrode thickness deviation is a coefficient of variation (CV) obtained by dividing a standard deviation by an average value. An average value of the electrode thickness deviations for the thirty internal electrodes is listed in Table 1 below.

As for a content of Cu, a cross-sectional surface (an L-T cross-sectional surface) taken in length and thickness directions of a central portion of a body disposed in a width direction (W) has been scanned using a scanning transmission electron microscope (STEM), and quantitative analysis of a content of Cu included in the internal electrode has been carried out using energy dispersive X-ray microanalysis (EDX).

More specifically, a content of Cu has been measured for three internal electrodes disposed in the central portion in the thickness direction in the image, and an average value of Cu contents of a ½ point taken in the thickness direction at five random points taken in the length direction of each internal electrode was determined as a Cu content of the internal electrode. Also, a Cu content of a ⅙ point in the thickness direction at the five points was measured, and an average value of a difference between the Cu content of the ½ point and the Cu content of the ⅙ point was determined as a deviation of Cu content, and the deviation is listed in Table 1 below.

TABLE 1

| Test No. | Internal Electrode (wt %) BaTiO$_3$ | Internal Electrode (wt %) Cu | Capacitance | High Temperature Load Reliability Initial Defects | High Temperature Load Reliability MTTF | Electrode Connectivity | Electrode Thickness Deviation | T-Contraction | Moisture Reliability | Deviation of a content of Cu (wt %) |
|---|---|---|---|---|---|---|---|---|---|---|
| 1* | 0 | 0.0 | 1.0 | 1.0 | 1.0 | 85% | 18% | Reference | 1.0 | — |
| 2* | 3 | 0.0 | 1.0 | 1.0 | 1.0 | 88% | 17% | — | 1.0 | — |
| 3* | 0 | 0.1 | 1.0 | 1.0 | 1.0 | 88% | 16% | 0.0% | 1.0 | 0.01 |
| 4* | 0 | 0.3 | 1.0 | 1.0 | 1.1 | 88% | 16% | 0.3% | 0.8 | 0.02 |
| 5 | 0 | 0.4 | 1.1 | 0.3 | 1.5 | 90% | 15% | 4.2% | 0.4 | 0.04 |
| 6 | 0 | 0.8 | 1.2 | 0.3 | 1.5 | 92% | 13% | 3.5% | 0.3 | 0.06 |
| 7 | 0 | 1.5 | 1.2 | 0.4 | 1.4 | 93% | 13% | 3.3% | 0.3 | 0.06 |
| 8 | 0 | 3.0 | 1.2 | 0.4 | 1.4 | 93% | 14% | 1.8% | 0.4 | 0.07 |
| 9 | 0 | 4.5 | 1.2 | 0.5 | 1.3 | 94% | 14% | 1.3% | 0.5 | 0.08 |
| 10 | 0 | 6.0 | 1.2 | 0.7 | 1.2 | 94% | 15% | 1.1% | 0.6 | 0.09 |
| 11* | 0 | 6.1 | 1.1 | 0.9 | 1.1 | 88% | 16% | 0.5% | 0.9 | 0.12 |
| 12* | 0 | 6.5 | 1.0 | 1.0 | 1.0 | 87% | 16% | — | 1.0 | 0.14 |

It has been indicated that, as for test Nos. 5 to 10 in which a content of Cu was 0.4 wt % or higher and 6.0 wt % or lower, initial defects decreased as compared to test No. 1 in which Cu was not added, and that capacitance, MTTF, electrode connectivity, T-contraction, and moisture resistance improved.

Also, comparing test Nos. 1 to 4 with test No. 5, it has been indicated that, when a content of Cu was 0.4 wt % or higher, T-contraction, MTTF, and moisture reliability significantly improved.

When 0.8 wt % or higher of Cu was added, the improvement of T-contraction and MTTF gradually decreased. When a content of Cu exceeded 6.0 wt %, the improvement of T-contraction, MTTF, and moisture reliability obtained by the addition of Cu was insignificant.

Thus, a preferable content of Cu included in the internal electrode is 0.4 wt % or higher and 6.0 wt % or lower.

Figure 7:
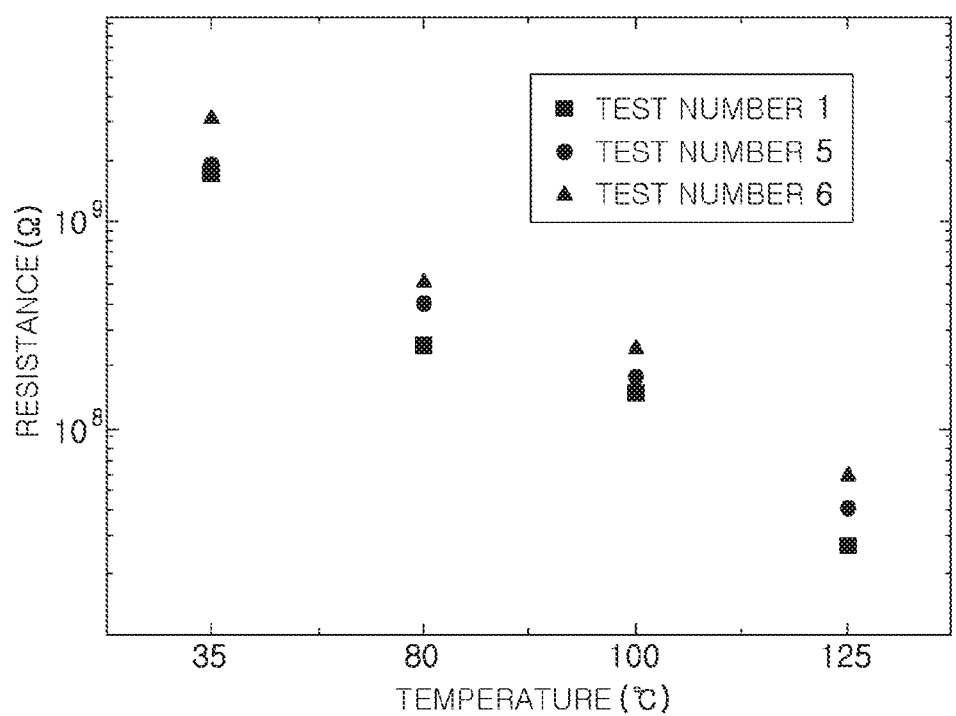
FIG. 7 is a graph illustrating insulating resistance (IR) properties at each temperature with respect to test Nos. 1, 5, and 6.

FIG. 7 is graphs illustrating insulation resistance (IR) properties of test Nos. 1, 5, and 6 at each temperature.

Referring to FIG. 7, it has been indicated that insulation resistance (IR) of test Nos. 5 and 6 in which internal electrodes including 0.4 wt % of Cu and 0.8 wt % of Cu, respectively, were applied improved further than that of test No. 1 including 0 wt % of Cu in a section of 35 to 125° C.

According to the aforementioned example embodiments, a multilayer electronic component having improved reliability may be provided.

While the exemplary embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer and an internal electrode alternately stacked therein in a stacking direction; and
an external electrode disposed on the body and connected to the internal electrode,
wherein the internal electrode includes 94.0 to 99.6 wt % of Ni and 0.4 to 6.0 wt % of Cu
a deviation between an amount of Cu at a ½ point of the internal electrode in the stacking direction and an amount of Cu at a ⅛ point of the internal electrode in the stacking direction is above 0 and 0.1 wt % or lower.

2. The multilayer electronic component of claim 1, wherein the external electrode is connected to the internal electrode in a length direction of the body perpendicular to the stacking direction.

3. The multilayer electronic component of claim 2, wherein the internal electrode includes one or more electrode portions spaced apart from each other in a cross-sectional view of the body in parallel with the length and stacking directions.

4. The multilayer electronic component of claim 3, wherein, when a ratio of a total length of the one or more electrode portions in the length direction to an overall length of the internal electrode in the length direction is defined as an internal electrode connectivity, the internal electrode connectivity of the multilayer electronic component is 90% or higher.

5. The multilayer electronic component of claim 2, wherein a length of the multilayer electronic component in the length direction is 0.4 mm or less, and a width of the multilayer electronic component in a width direction perpendicular to the length and stacking directions is 0.2 mm or less.

6. The multilayer electronic component of claim 1, wherein an electrode thickness deviation of the internal electrode is 15% or lower.

7. The multilayer electronic component of claim 1, wherein a deviation between an amount of Cu at a ½ point of the internal electrode in the stacking direction and an amount of Cu at a ⅛ point of the internal electrode in the stacking direction is 0.1 wt % or lower.

8. The multilayer electronic component of claim 1, wherein the Ni and Cu are included in the internal electrode in a form of an Ni—Cu alloy.

9. The multilayer electronic component of claim 1, wherein the internal electrode is made of an Ni—Cu alloy.

10. The multilayer electronic component of claim 1, wherein a thickness of the internal electrode in the stacking direction is 0.41 µm or less.

11. The multilayer electronic component of claim 1, wherein the internal electrode is made of a conductive paste which includes Ni—Cu alloy powder and does not include ceramic.

12. The multilayer electronic component of claim 1, wherein the body includes first and second internal electrodes alternately stacked with the dielectric layer interposed therebetween.

13. A multilayer electronic component, comprising:
a body including a dielectric layer and an internal electrode alternately stacked therein in a stacking direction; and
an external electrode disposed on the body and connected to the internal electrode,
wherein the internal electrode includes 94.0 to 99.6 wt % of Ni and 0.4 to 6.0 wt % of Cu, wherein Ni and Cu are the only main components for the internal electrode, and
wherein Cu is uniformly distributed in the internal electrode.

14. The multilayer electronic component of claim 13, wherein the external electrode is connected to the internal electrode in a length direction of the body perpendicular to the stacking direction.

15. The multilayer electronic component of claim 14, wherein the internal electrode includes one or more electrode portions spaced apart from each other in a cross-sectional view of the body in parallel with the length and stacking directions.

16. The multilayer electronic component of claim 15, wherein, when a ratio of a total length of the one or more electrode portions in the length direction to an overall length of the internal electrode in the length direction is defined as an internal electrode connectivity, the internal electrode connectivity of the multilayer electronic component is 90% or higher.

17. The multilayer electronic component of claim 14, wherein a length of the multilayer electronic component in the length direction is 0.4 mm or less, and a width of the multilayer electronic component in a width direction perpendicular to the length and stacking directions is 0.2 mm or less.

18. The multilayer electronic component of claim 13, wherein an electrode thickness deviation of the internal electrode is 15% or lower.

19. The multilayer electronic component of claim 13, wherein the Ni and Cu are included in the internal electrode in a form of an Ni—Cu alloy.

20. The multilayer electronic component of claim 13, wherein the internal electrode is made of an Ni—Cu alloy.

21. The multilayer electronic component of claim 13, wherein a thickness of the internal electrode in the stacking direction is 0.41 µm or less.

22. The multilayer electronic component of claim 13, wherein the internal electrode is made of a conductive paste which includes Ni—Cu alloy powder and does not include ceramic.

23. The multilayer electronic component of claim 13, wherein the body includes first and second internal electrodes alternately stacked with the dielectric layer interposed therebetween.

\* \* \* \* \*